United States Patent
Chen (10) Patent No.: US 9,178,431 B2
(45) Date of Patent: Nov. 3, 2015

(54) SWITCHING POWER SUPPLY INCLUDING THRESHOLD BASED PERMISSIONS

(71) Applicant: FUJI ELECTRIC CO., LTD., Kawasaki-shi (JP)

(72) Inventor: Jian Chen, Matsumoto (JP)

(73) Assignee: FUJI ELECTRIC CO., LTD. (JP)

( * ) Notice: Subject to any disclaimer, the term of this patent is extended or adjusted under 35 U.S.C. 154(b) by 195 days.

(21) Appl. No.: 13/940,394

(22) Filed: Jul. 12, 2013

(65) Prior Publication Data

US 2014/0016363 A1 Jan. 16, 2014

(30) Foreign Application Priority Data

Jul. 13, 2012 (JP) .................................. 2012-157049

(51) Int. Cl.
| | |
|---|---|
| *G06F 1/00* | (2006.01) |
| *H02J 1/10* | (2006.01) |
| *H02M 7/757* | (2006.01) |
| *H02M 3/335* | (2006.01) |
| *H02M 1/42* | (2007.01) |
| *H02M 1/00* | (2007.01) |

(52) U.S. Cl.
CPC ............ *H02M 3/335* (2013.01); *H02M 1/4225* (2013.01); *H02M 3/33515* (2013.01); *H02M 2001/007* (2013.01); *H02M 2001/0032* (2013.01); *H02M 2001/0058* (2013.01); *Y02B 70/126* (2013.01); *Y02B 70/1433* (2013.01); *Y02B 70/1491* (2013.01); *Y02B 70/16* (2013.01)

(58) Field of Classification Search
USPC ............ 323/266, 274, 275, 284, 285; 363/65, 363/67, 68, 71, 74, 78, 79
See application file for complete search history.

(56) References Cited

U.S. PATENT DOCUMENTS

| | | | | |
|---|---|---|---|---|
| 7,453,248 | B2* | 11/2008 | Takeuchi | 323/285 |
| 7,489,532 | B2* | 2/2009 | Shih | 363/89 |
| 2005/0088862 | A1* | 4/2005 | Simada et al. | 363/49 |
| 2005/0128773 | A1* | 6/2005 | Yang et al. | 363/21.01 |
| 2006/0056210 | A1* | 3/2006 | Yamada et al. | 363/63 |
| 2008/0278974 | A1* | 11/2008 | Wu | 363/21.18 |
| 2009/0147553 | A1* | 6/2009 | Ryu et al. | 363/65 |
| 2010/0020578 | A1* | 1/2010 | Ryu et al. | 363/68 |
| 2010/0135050 | A1* | 6/2010 | Sonobe | 363/21.07 |
| 2012/0001599 | A1* | 1/2012 | Tanaka | 323/205 |

FOREIGN PATENT DOCUMENTS

| | | |
|---|---|---|
| JP | 2007-288855 A | 11/2007 |
| JP | 2010-220330 A | 9/2010 |
| JP | 2011-015570 A | 1/2011 |

* cited by examiner

*Primary Examiner* — Adolf Berhane
*Assistant Examiner* — Gary Nash
(74) *Attorney, Agent, or Firm* — Rossi, Kimm & McDowell LLP (57) ABSTRACT

Aspects of the invention provide a switching power supply that exhibits an improved conversion efficiency. In aspects of the invention, a load condition detecting circuit sets a threshold voltage for determining the magnitude of the load on the DC-DC converter based on the maximum value of the output voltage of the power factor correction converter in a suspended period of the power factor correction converter. An operation permission signal is delivered when a feedback voltage that indicates the magnitude of the load of the DC-DC converter exceeds the threshold voltage. When the feedback voltage exceeds a threshold voltage that is set at a value higher than the threshold voltage, the operation permission signal is delivered.

7 Claims, 10 Drawing Sheets

SWITCHING POWER SUPPLY INCLUDING THRESHOLD BASED PERMISSIONS

BACKGROUND OF THE INVENTION

1. Field of the Invention

Embodiments of the invention relate to switching power supplies, and, in particular, switching power supplies including power factor correction converters.

2. Description of the Related Art

Power factor correction is used for switching power supplies of power rating over 75 W to provide stability and safety in commercial power systems. Recently, a switching power supply has been proposed in Japanese Unexamined Patent Application Publication No. 2007-288855, for example, having a small-sized and highly efficient power factor correction converter (PFC) and a DC-DC converter that converts a DC voltage obtained by the PFC into an output DC voltage according to the specification of the load. The DC-DC converters employed in such switching power supplies are often quasi-resonance converters (QR) in the case of a rated load of about 100 W because of a little burden on a rectifying diode in the secondary side.

Figure 7:
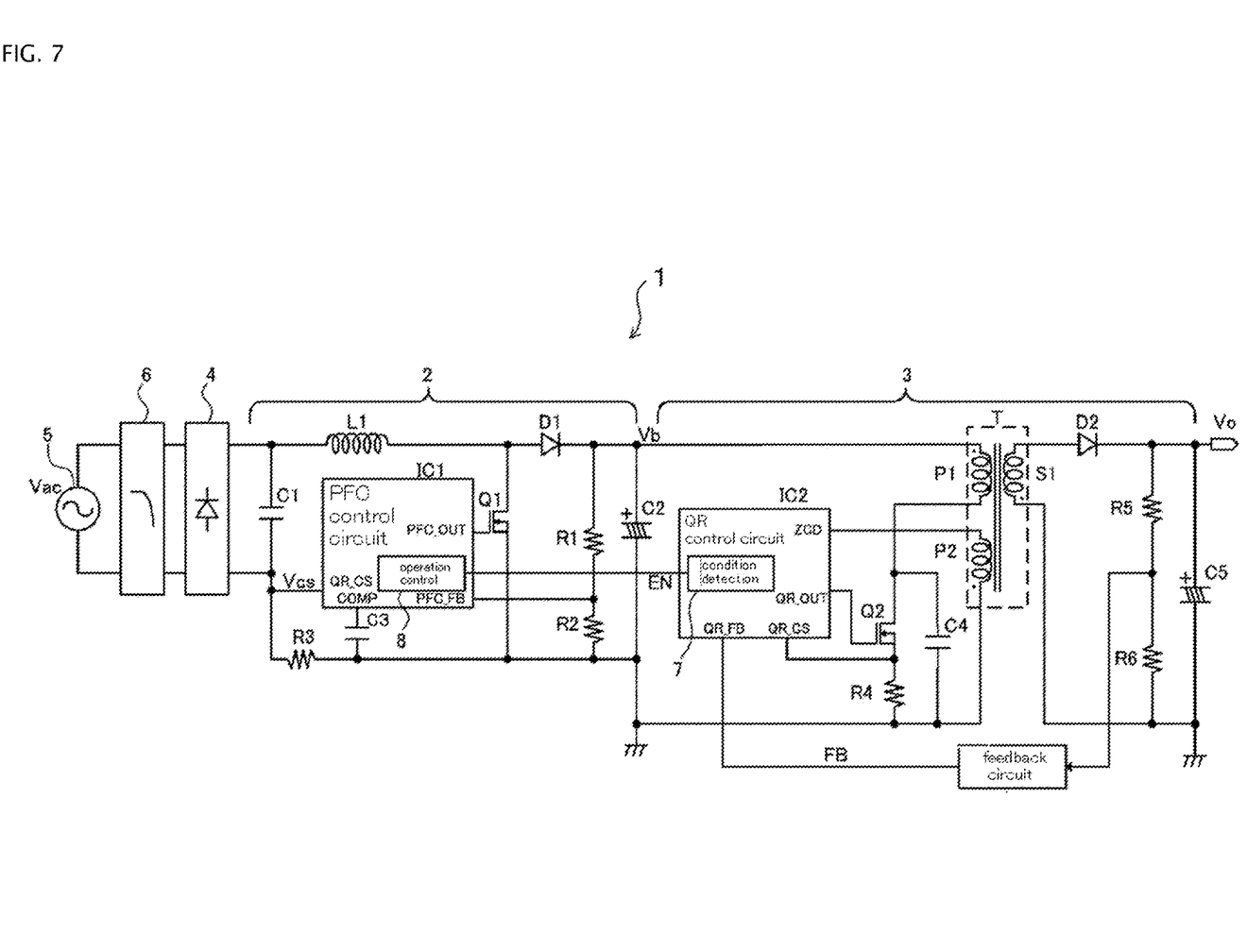
FIG. 7 shows a schematic construction of a switching power supply having a power factor correction converter and a DC-DC converter that is a quasi-resonance converter.

FIG. 7 shows a schematic construction of a switching power supply 1 having a power factor correction converter 2 and a DC-DC converter 3 that is a quasi-resonance converter. FIG. 7 also shows a rectifying circuit 4 that rectifies the AC power supplied by the commercial power supply 5 and delivers to the power factor correction converter 2, and a noise filter 6 interposed between the rectifying circuit 4 and the commercial power supply 5.

The power factor correction converter 2 comprises an inductor L1 connected to the rectifying circuit 4, a switching element Q1, and a diode D1. The switching element Q1 forms a current path from the rectifying circuit 4 through the inductor L1 in the ON state of the switching element Q1. The diode D1 forms a current path from the inductor L1 to an output capacitor C2 in the OFF state of the switching element Q1. The power factor correction converter 2 comprises a control circuit IC1 that ON/OFF drives the switching element Q1 to control the current flowing through the inductor L1 thereby obtaining a stable DC voltage Vb.

Resistors R1 and R2 divide the voltage Vb across the output capacitor C2. The divided voltage is fed back to the control circuit IC1. A shunt resistor R3 detects the current flowing through the load of the power factor correction converter 2. The operation and effects of the power factor correction converter 2 as described above are disclosed in detail in Japanese Unexamined Patent Application Publication No. 2010-220330, for example.

The DC-DC converter 3 that is a quasi-resonance converter basically comprises: an isolating transformer T having a primary winding P1, a secondary winding S1, and an auxiliary winding P2; a switching element Q2 connected to the primary winding P1, which receives the output DC voltage Vb of the power factor correction converter 2; a resonance capacitor C4 connected in parallel with the switching element Q2; and an output capacitor C5 connected through a rectifying diode D2 to the secondary winding S1 of the isolating transformer T. The DC-DC converter 3 comprises a control circuit IC2 that ON/OFF drives the switching element Q2 to generate quasi-resonance phenomenon with a leakage inductance of the transformer T and the resonance capacitor C4, thereby obtaining a specified output DC voltage Vo.

The resistances R5 and R6 divide the output DC voltage Vo across the output capacitor C5. The divided voltage is fed back to the control circuit IC2 through a feedback circuit. A shunt resistor R4 detects the current flowing through the switching element Q2. The DC-DC converter 3 detects a ZCD voltage developed on the auxiliary winding P2 of the isolating transformer T and controls the turn ON timing of the switching element Q2. The operation and effects of the DC-DC converter 3 that is a quasi-resonance converter as described above are disclosed in detail in Japanese Unexamined Patent Application Publication No. 2011-015570, for example.

The DC-DC converter 3 is provided with a load condition detecting circuit 7 that detects a load condition and delivers an operation permission signal EN for operation of the power factor correction converter 2 to permit or stop the operation of the power factor correction converter 2. The power factor correction converter 2 is provided with an operation control circuit 8 that permits or stops operation of the power factor correction converter 2 according to the operation permission signal EN. The load condition detecting circuit 7 suspends operation of the power factor correction converter 2 under a light load condition of an input power lower than 75 W, for example, to eliminate any power loss in the power factor correction converter 2. Thus, the overall power conversion efficiency of a switching power supply 1 is improved.

Figure 8:
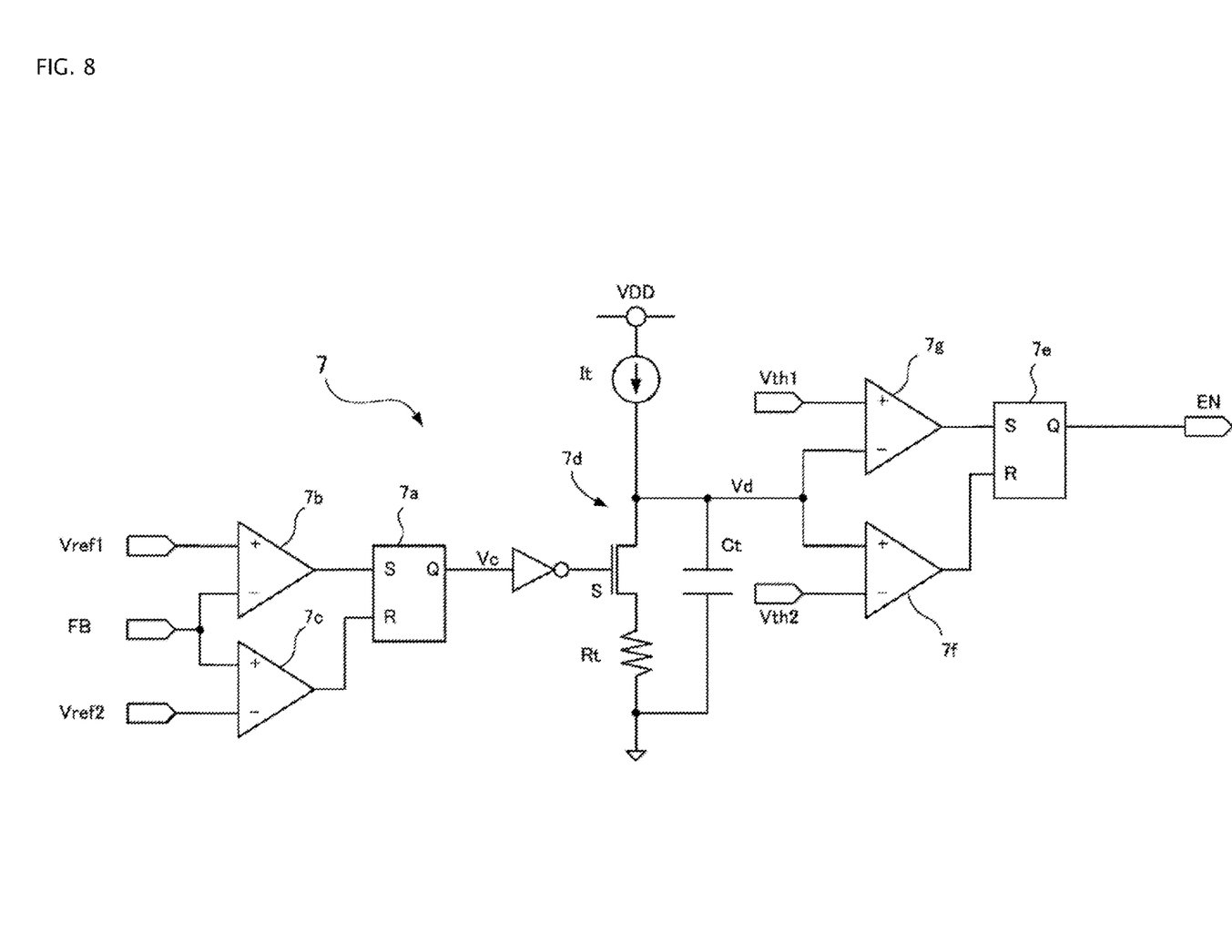
FIG. 8 shows a conventional example of construction of a load condition detecting circuit installed in a DC-DC converter.

The load condition detecting circuit 7 is constructed as shown in FIG. 8, for example, and installed in the control circuit IC2. The load condition detecting circuit 7 comprises a comparator 7b, which is a light load detecting circuit, and a comparator 7c, which is a middle load detecting circuit. The light load detecting circuit 7b determines a light load condition and sets a flip-flop 7a when the feedback voltage FB, which is used for ON/OFF controlling the switching element Q2 in the DC-DC converter 3, falls below a preset first threshold voltage Vref1. The middle load detecting circuit 7c determines a middle load condition, which is with an ordinary load, and resets the flip-flop 7a when the feedback voltage FB exceeds a second threshold voltage Vref2, which is larger than Vref1 and explained later. The output of the flip-flop 7a is used for set/reset control of a flip-flop 7e after delaying processing through a delay circuit 7d utilizing charging and discharging of a capacitor Ct. Thus, the operation permission signal EN is obtained as a set output of the flip-flop 7e.

The delay circuit 7d comprises the capacitor Ct and a switching element S connected in parallel with the capacitor Ct. When the output of the flip-flop 7a is in an H level, the switching element S is in an OFF state to charge the capacitor Ct with a constant current source It. When the output of the flip-flop 7a is at an L level, the switching element S is in an ON state to discharge the charges accumulated on the capacitor Ct through the resistor Rt. The load condition detecting circuit 7 comprises comparators 7f and 7g. The comparator 7f resets the flip-flop 7e when the charged voltage Vd on the capacitor Ct exceeds a second reference voltage Vth2; and the comparator 7g sets the flip-flop 7e when the charged voltage Vd falls below a first reference voltage Vth1.

Figure 9:
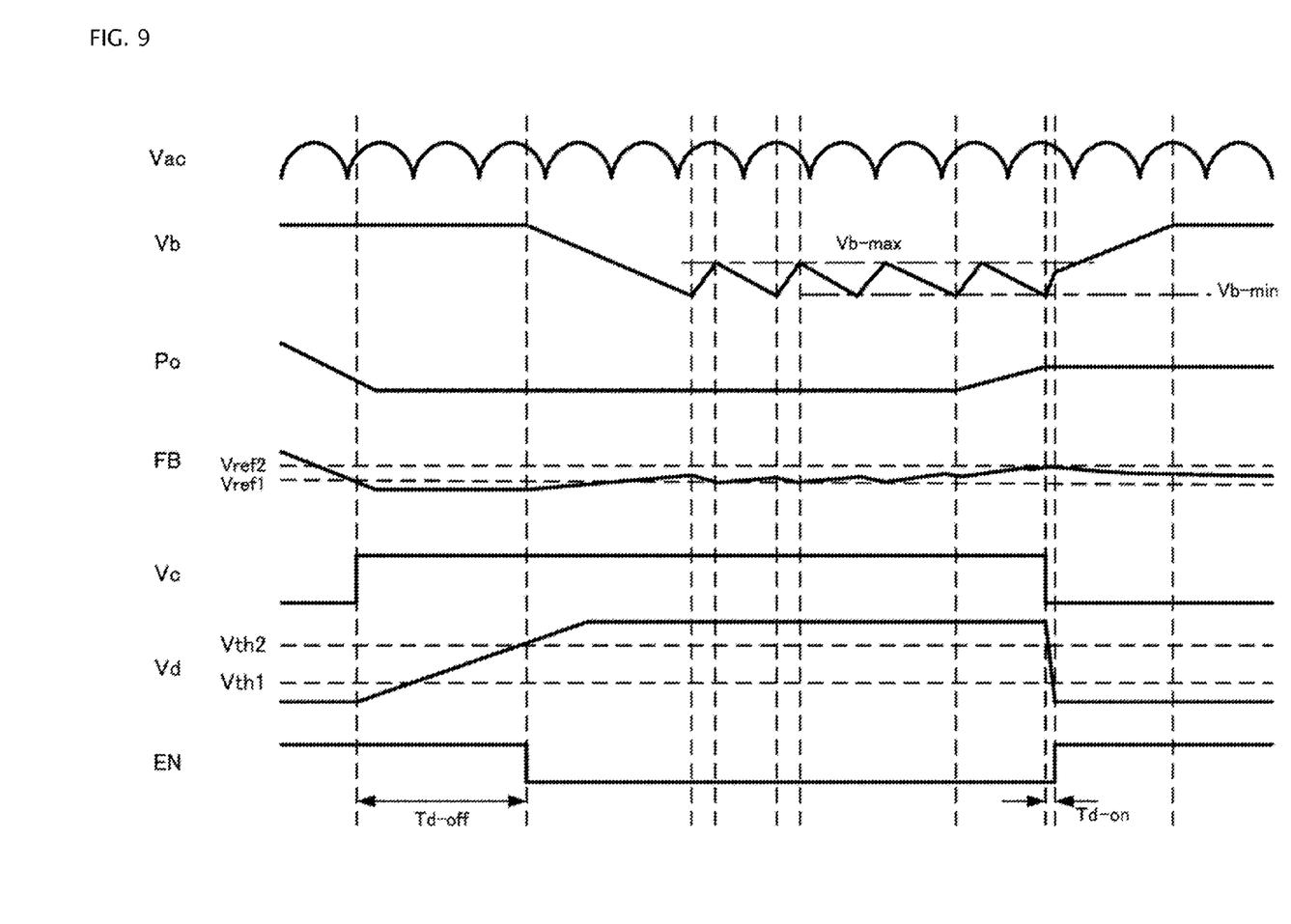
FIG. 9 shows operational waveforms illustrating operation and action of the load condition detecting circuit of FIG. 8.

FIG. 9 illustrates waveforms in operation of the load condition detecting circuit 7 having the construction described above. When the load Po becomes lighter and the feedback voltage FB drops below the first threshold value Vref1, the flip-flop 7a is set. According to the setting of the flip-flop 7a, the switching element S in the delay circuit 7d turns OFF and the capacitor Ct is charged with a rate determined by the capacitance of the capacitor Ct and the magnitude of the constant current fed by the constant current source It. After a specified period of time Td-off when the charged voltage Vd of the capacitor Ct exceeds the reference voltage Vth2, the flip-flop 7e is reset and the operation permission signal EN turns to an L level to control the power factor correction converter 2 to stop.

After stop of operation of the power factor correction converter 2, the output voltage Vb of the power factor correction converter 2 gradually decreases and then settles down to a voltage determined by the AC voltage Vac supplied by the commercial power supply 5. The output voltage Vb of the power factor correction converter 2 changes periodically with a period of rectification of the AC voltage Vac and an amplitude determined by the magnitude of the load Po and the capacitance of the output capacitor C2.

In this suspended state of operation of the power factor correction converter 2, when the load Po becomes heavy, the feedback voltage FB in the DC-DC converter 3 rises. When the feedback voltage FB exceeds the second threshold voltage Vref2, the flip-flop 7a is reset and the charges accumulated on the capacitor Ct in the delay circuit 7d are discharged. After a specified period of time Td-on when the charged voltage Vd of the capacitor Ct falls below the reference voltage Vth1, the flip-flop 7e is set to turn the operation permission signal EN to an H level. Consequently, operation of the power factor correction converter 2 is permitted and the power factor correction converter 2 resumes operation.

In the suspended state of the power factor correction converter 2, the DC voltage Vb obtained at the output capacitor C2 of the power factor correction converter 2 changes periodically as described previously with an amplitude determined by the magnitude of the load Po and the capacitance of the output capacitor C2. Accordingly, it has been noted conventionally that the bottom voltage Vb-min of the DC voltage Vb varies depending on the magnitude of the load Po and thus, the second threshold voltage Vref2 for the feedback voltage FB has been set based on the minimum of the DC voltage Vb, the bottom voltage Vb-min.

When the AC voltage Vac is lower than the rated voltage, for example 100 V, or in the case of a small capacitance of the output capacitor C2, even through without large variation in the load Po, the feedback voltage FB rises with decrease in the DC voltage Vb as described earlier. Thus, a situation arises that the feedback voltage FB becomes higher than the second threshold voltage Vref2 that is set based on the minimum of the DC voltage Vb, the bottom voltage Vb-min. This situation causes erroneous detection of increase in the load Po. Thus there is a problem that distinct detection of the rise of the feedback voltage FB that is caused by the increase in the load Po cannot be assured.

Figure 10:
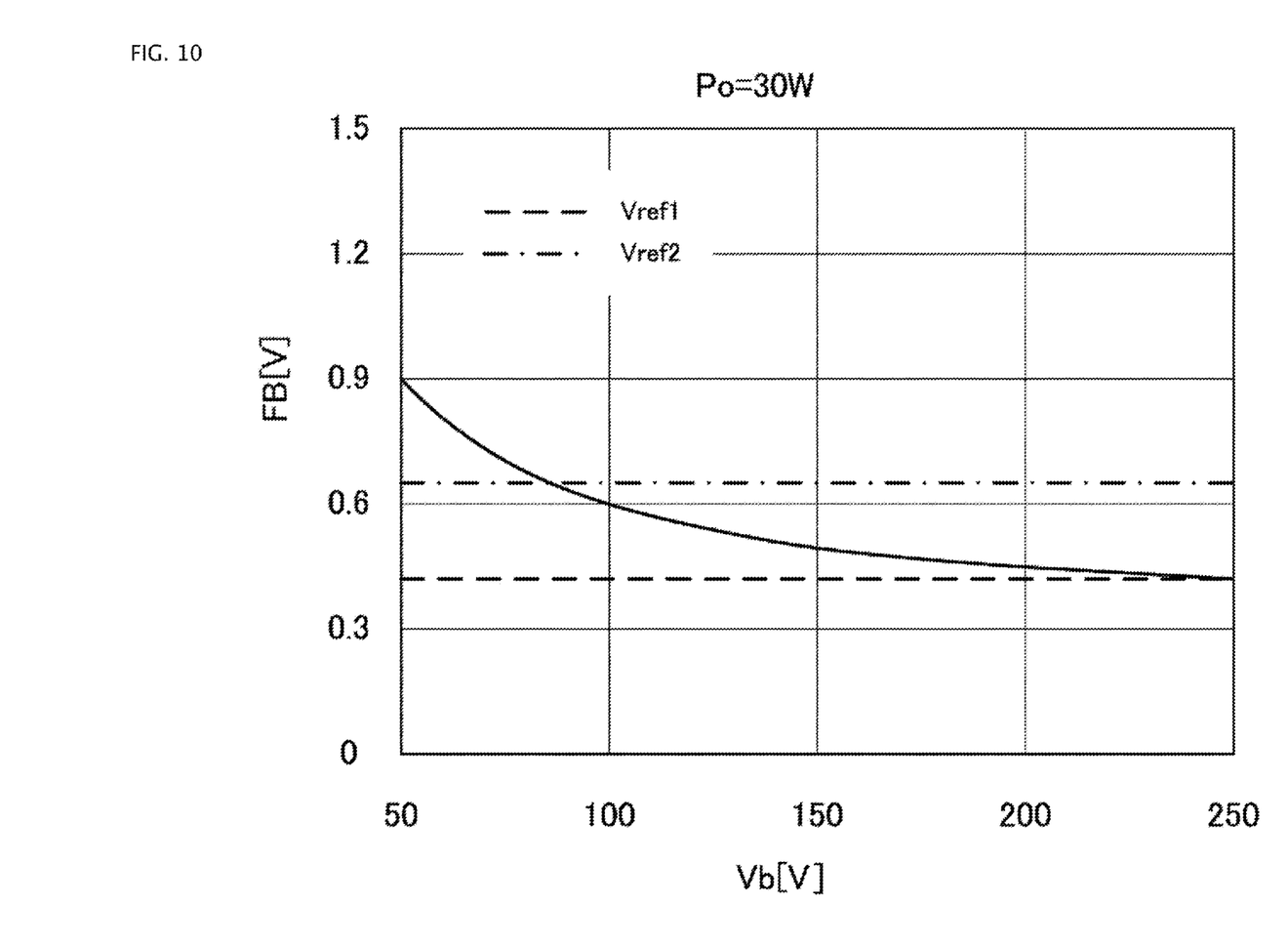
FIG. 10 shows a relationship between DC voltage Vb and feedback voltage FB under the condition of a constant load.

FIG. 10 shows a relationship between the feedback voltage FB and the DC voltage Vb depending on the AC voltage Vac in the case of a load Po of a constant value of 30 W, for example. It is shown that the feedback voltage FB increases with decrease in the DC voltage Vb. When the output DC voltage Vb becomes below about 85 V, the feedback voltage FB is always higher than the second threshold voltage Vref2 despite the fact that the load Po is in a light load condition of 30 W constant.

The comparator 7c detects this state to reset the flip-flop 7a, which in turn sets the flip-flop 7e and turns the operation permission signal EN to an H level. Thus, the power factor correction converter 2 changes into an operating state according to the operation permission signal EN despite no change in the magnitude of the load Po. Therefore, it becomes impossible to perform the intended operation in which when the DC voltage Vb decreases with drop of the AC voltage Vac, the power factor correction converter 2 resumes operation thereof after detecting increase in the load Po in a suspended state of the power factor correction converter 2.

To cope with this problem, the second threshold voltage Vref2 could be set relatively high. A high value of the second threshold voltage Vref2, however, makes detection of increased load Po difficult. As a result, when the AC voltage Vac is stable at a sufficiently high value and the operation of the power factor correction converter 2 is suspended, increase in the load Po may not cause operation of the power factor correction converter 2 resume. As a consequence, the DC-DC converter 3 may also fail to adapt to and deal with the increase in the load Po, causing another problem of poor operation of the switching power supply itself. Thus, as has been discussed above, there is a need in the art for an improved switching power supply.

SUMMARY OF THE INVENTION

Embodiments of the invention address these and other needs. Embodiments of the invention provide a switching power supply that does not permit unintended operation of a power factor correction converter 2 in a light load condition even under a condition of dropped AC voltage, and that starts operation of the power factor correction converter 2 immediately on an event of rapid increase in the load, thereby ensuring appropriate control of the power factor correction converter 2 corresponding to the load condition to improve the conversion efficiency of the switching power supply.

Some embodiments include: a power factor correction converter that conducts switching of an input AC voltage to obtain a DC voltage; a DC-DC converter, a quasi-resonance converter, for example, that conducts switching of an output voltage Vb of the power factor correction converter to obtain a specified DC output voltage Vo; and a load condition detecting circuit that delivers an operation permission signal EN to the power factor correction converter corresponding to a load condition of the DC-DC converter and permit or stop operation of the power factor correction converter; wherein the load condition detecting circuit sets a second threshold voltage and a third threshold voltage for determining a magnitude of the load on the DC-DC converter based on the maximum value Vb-max of the output voltage Vb of the power factor correction converter in a suspended state of operation of the power factor correction converter; delivers the operation permission signal EN when a signal indicating the magnitude of the load on the DC-DC converter exceeds the second threshold voltage for a specified period of time in a suspended state of operation of the power factor correction converter; and delivers the operation permission signal EN when the signal indicating the magnitude of the load on the DC-DC converter exceeds the third threshold voltage in a suspended state of operation of the power factor correction converter.

In some embodiments, the load condition detecting circuit comprises a voltage detecting means that detects the maximum value of the output voltage of the power factor correction converter in a suspended state of operation of the power factor correction converter, and the load condition detecting circuit sets the second threshold voltage and the third threshold voltage for determining the magnitude of the load on the DC-DC converter corresponding to the maximum of the output voltage that is detected by the voltage detecting means.

Specifically, in some embodiments, the second threshold voltage and the third threshold voltage are set as threshold voltages for a feedback voltage FB that is used for controlling a DC output voltage in the DC-DC converter, or alternatively, the second threshold voltage and the third threshold voltage are set as threshold voltages for a periodic voltage Vsw that is proportional to a period of time Tonoff of an ON/OFF driving period of an switching element in the DC-DC converter.

In some embodiments, the load condition detecting circuit comprises: a flip-flop that delivers the operation permission signal EN when the flip-flop is reset; a light load detecting circuit that sets the flip-flop when the feedback voltage FB of the DC-DC converter falls below a predetermined first threshold voltage Vref1; a middle load detecting circuit that resets the flip-flop when the feedback voltage FB exceeds, for a specified period of time Tdelay which can be about a half period of the AC voltage or longer, a second threshold voltage Vref2 that is higher than the first threshold voltage Vref1 and determined based on the maximum value Vb-max of an input voltage of the DC-DC converter; and a heavy load detecting circuit that resets the flip-flop forcedly when the feedback voltage FB exceeds a third threshold voltage that is set at a value higher than the second threshold voltage.

Alternatively, in other embodiments, the load condition detecting circuit comprises: a flip-flop that delivers the operation permission signal EN when the flip-flop is reset; a light load detecting circuit that sets the flip-flop when the periodic voltage Vsw of the DC-DC converter falls below a predetermined first threshold voltage Vref1; a middle load detecting circuit that resets the flip-flop when the periodic voltage Vsw exceeds, for a specified period of time Tdelay which can be about a half period of the AC voltage or longer, a second threshold voltage Vref2 that is higher than the first threshold voltage Vref1 and determined based on the maximum value Vb-max of an input voltage of the DC-DC converter; and a heavy load detecting circuit that resets the flip-flop forcedly when the periodic voltage exceeds a third threshold voltage that is set at a value higher than the second threshold voltage.

In some embodiments of a switching power supply having the construction described above, the second threshold voltage Vref2 for detecting increase in the load Po in a suspended period of the power factor correction converter is determined based on the maximum value Vb-max of the output voltage Vb of the power factor correction converter in a suspended time of the power factor correction converter. The maximum value Vb-max of the output voltage Vb of the power factor correction converter depends neither on the capacitance of the output capacitor of the power factor correction converter nor on varying magnitude of the load Po of the DC-DC converter, but the maximum value Vb-max depends only on the magnitude of the AC voltage Vac.

Thus, in some embodiments, even in the case the feedback voltage FB rises with decrease of the output voltage Vb, since the second threshold voltage Vref2 for the feedback voltage FB is set corresponding to the decrease in the output voltage Vb, such an erroneous detection is avoided that the increase in the feedback voltage FB caused by the decrease in the output voltage Vb is recognized incorrectly as increase in the load Po. The load condition detecting circuit of a switching power supply of the invention ensures detection of solely the increase in the feedback voltage FB that is caused by the increase in the load Po.

Also, in some embodiments, in the case the second threshold voltage Vref2 is set for the periodic voltage Vsw proportional to the period of time Tonoff of the ON/OFF driving period of the switching element in the DC-DC converter, such an erroneous detection is similarly avoided that the increase in the periodic voltage Vsw caused by the decrease in the output voltage Vb is recognized incorrectly as increase in the load Po. Thus, the load condition detecting circuit of a switching power supply of the invention ensures detection of solely the increase in the periodic voltage Vsw that is caused by the increase in the load Po.

Consequently, it should not occur for the second threshold voltage Vref2 to be surpassed by the feedback voltage FB or by the periodic voltage Vsw caused by the decrease in the output voltage Vb due to the drop of the AC voltage Vac in a constant light load condition, although such event may occur when the second threshold voltage Vref2 is set based on the minimum value, the bottom voltage Vb-min, of the output voltage Vb. Therefore, the power supply of the invention ensures control of operation and suspension of operation of the power factor correction converter corresponding to the load condition even in the case of drop of the AC voltage Vac, improving the overall conversion efficiency of the switching power supply.

In some embodiments, in the case the load Po increases abruptly, the load condition detecting circuit of the switching power supply of the invention detects rapid increase of the feedback voltage FB or the periodic voltage Vsw utilizing the third threshold voltage Vref3. When the feedback voltage FB or the periodic voltage Vsw exceeds the third threshold voltage Vref3, the operation permission signal EN is delivered forcedly, immediately making the power factor correction converter into operation. Thus, such an event is avoided that the DC-DC converter fails to deal with the abrupt increase in the load Po. Therefore, a switching power supply 1, of embodiments of the invention, provides for stable operation.

DETAILED DESCRIPTION

The following describes a switching power supply according to embodiments of the present invention, with reference to the accompanying drawings.

The switching power supply 1 of some embodiments of the invention has a similar construction as the conventional one shown in FIG. 7. The switching power supply 1 of the invention comprises a power factor correction converter 2, a DC-DC converter 3 that performs switching operation on the output voltage Vb of the power factor correction converter 2 to obtain a specified DC output voltage Vo, and a load condition detecting circuit 7 that delivers an operation permission signal EN to the power factor correction converter 2 corresponding to the load condition of the DC-DC converter 3 to control operation and suspension of the power factor correction converter 2.

Figure 1:
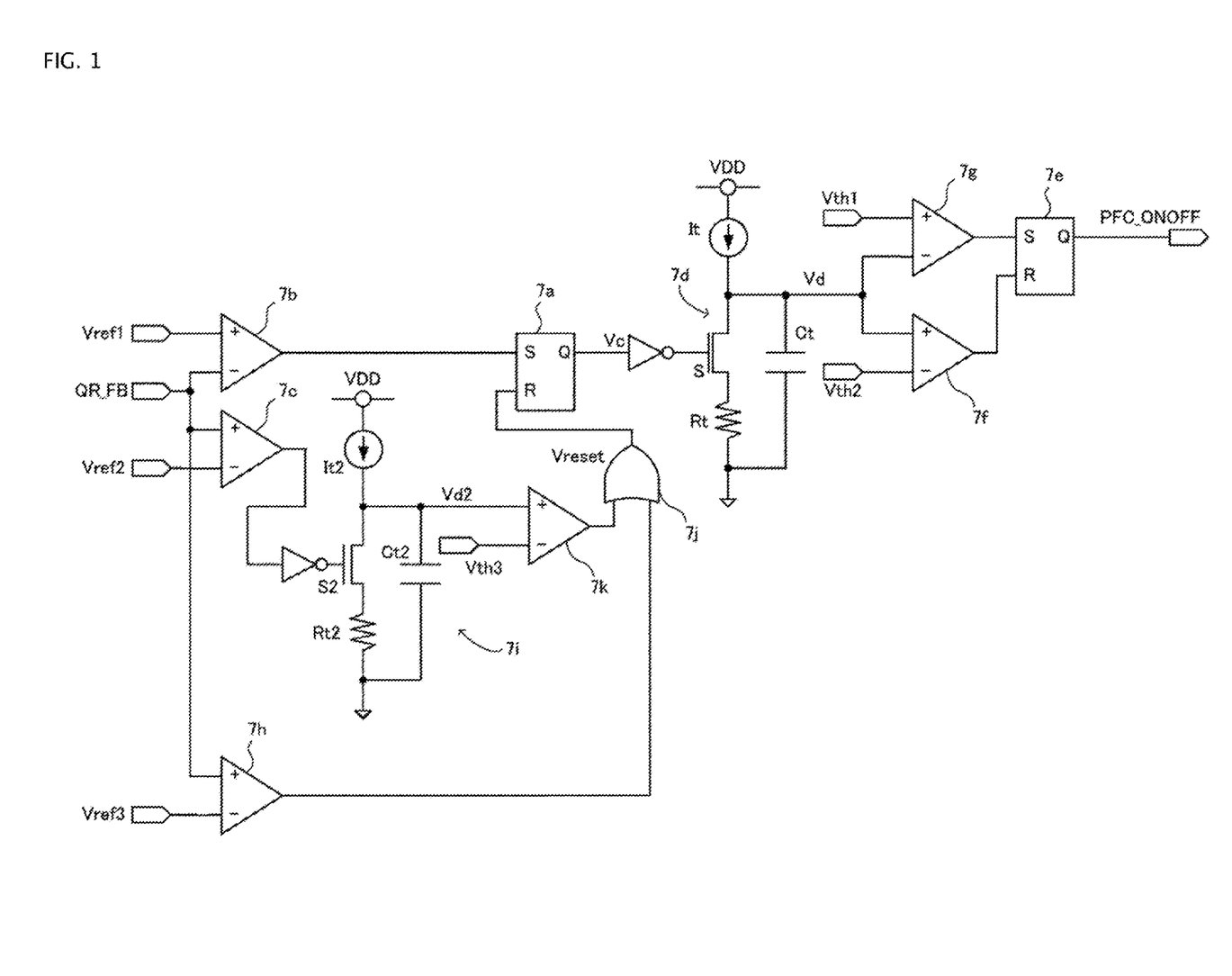
FIG. 1 shows an example of construction of a load condition detecting circuit that is a characteristic component of a switching power supply according to an embodiment of the present invention.

FIG. 1 shows a schematic construction of the load condition detecting circuit 7 installed in the DC-DC converter 3, which is a quasi-resonance converter, the load condition detecting circuit 7 being a characteristic part of the switching power supply 1 of the invention. Although the load condition detecting circuit 7 of FIG. 1 performs basically the similar function as the conventional load condition detecting circuit 7 in FIG. 8, the load condition detecting circuit 7 in the invention comprises a comparator 7h for detecting a heavy load as well as the comparator 7b for detecting a light load and the comparator 7c for detecting a middle load, which is a normal load.

In addition, the load condition detecting circuit 7 of embodiments of the invention comprises a delay circuit 7i for delaying the output of the comparator 7c for a specified period of time Tdelay, and an OR circuit 7j for delivering the output of the delay circuit 7i or the output of the comparator 7h to the reset terminal of the flip-flop 7a. Some embodiments include a second threshold voltage Vref2 set for the comparator 7c and a third threshold voltage Vref3 set for the comparator 7h, the Vref3 being greater than Vref2, are determined based on the maximum value of the output voltage Vb, the peak voltage Vb-max, of the power factor correction converter 2.

When the output voltage Vb decreases under the condition of a constant load Po, the feedback voltage FB of the DC-DC converter 3 rises in order to maintain the specified DC output voltage Vo. As a consequence, the feedback voltage FB would exceed, as described previously, the second threshold voltage Vref2 that is set based on the minimum value of the output voltage Vb, the bottom voltage Vb-min, of the power factor correction converter 2 depending on the load Po.

In contrast, by setting the second and third threshold voltages Vref2 and Vref3 based on the maximum value of the output voltage Vb, the peak voltage Vb-max as in the invention, the second and third threshold voltages Vref2 and Vref3 for the feedback voltage FB increases corresponding to the decreased output voltage Vb. Thus the feedback voltage FB that increases with decrease in the output voltage Vb does not exceed the second and third threshold voltages Vref2 and Vref3. Therefore, the load condition detecting circuit of the invention ensures detection only of the increase in the feedback voltage FB that is caused by increase in the load Po.

Description is made here about the delay circuit 7i for delaying the output of the comparator 7c for a specified period of time Tdelay. The delay circuit 7i comprises a capacitor Ct2, a constant current source It2, a switching element S2, and a comparator 7k. The switching element S2 is in an OFF state when the output of the comparator 7c is at an H level, and the capacitor Ct2 is charged by the constant current source It2. The switching element S2 is in an ON state when the output of the comparator 7c is at an L level, and the capacitor Ct2 is discharged through a resistor Rt2. The comparator 7k resets the flip-flop 7a when the charged voltage Vb2 of the capacitor Ct2, which is charged and discharged in the way as described above, exceeds a reference voltage Vth3. The specified period of time Tdelay is set at about a half period of the AC voltage Vac, which is about 10 ms in the case of 50 Hz AC voltage, for example.

Owing to the delay circuit 7i having the construction described above, even if the feedback voltage FB temporarily exceeds the threshold voltage Vref2 to turn the output of the comparator 7c to an H level, the flip-flop 7a is not reset as long as the H level does not continue for the specified period of time Tdelay, which is about 10 ms. In other words, if the feedback voltage FB is continuously higher than the second threshold voltage Vref2 for the specified period of time Tdelay, the load condition detecting circuit 7 determines detection of increase in the load Po and reset the flip-flop 7a. The reset of the flip-flop 7a, through the delay circuit 7d, sets the flip-flop 7e, and an operation permission signal EN is delivered.

Figure 2:
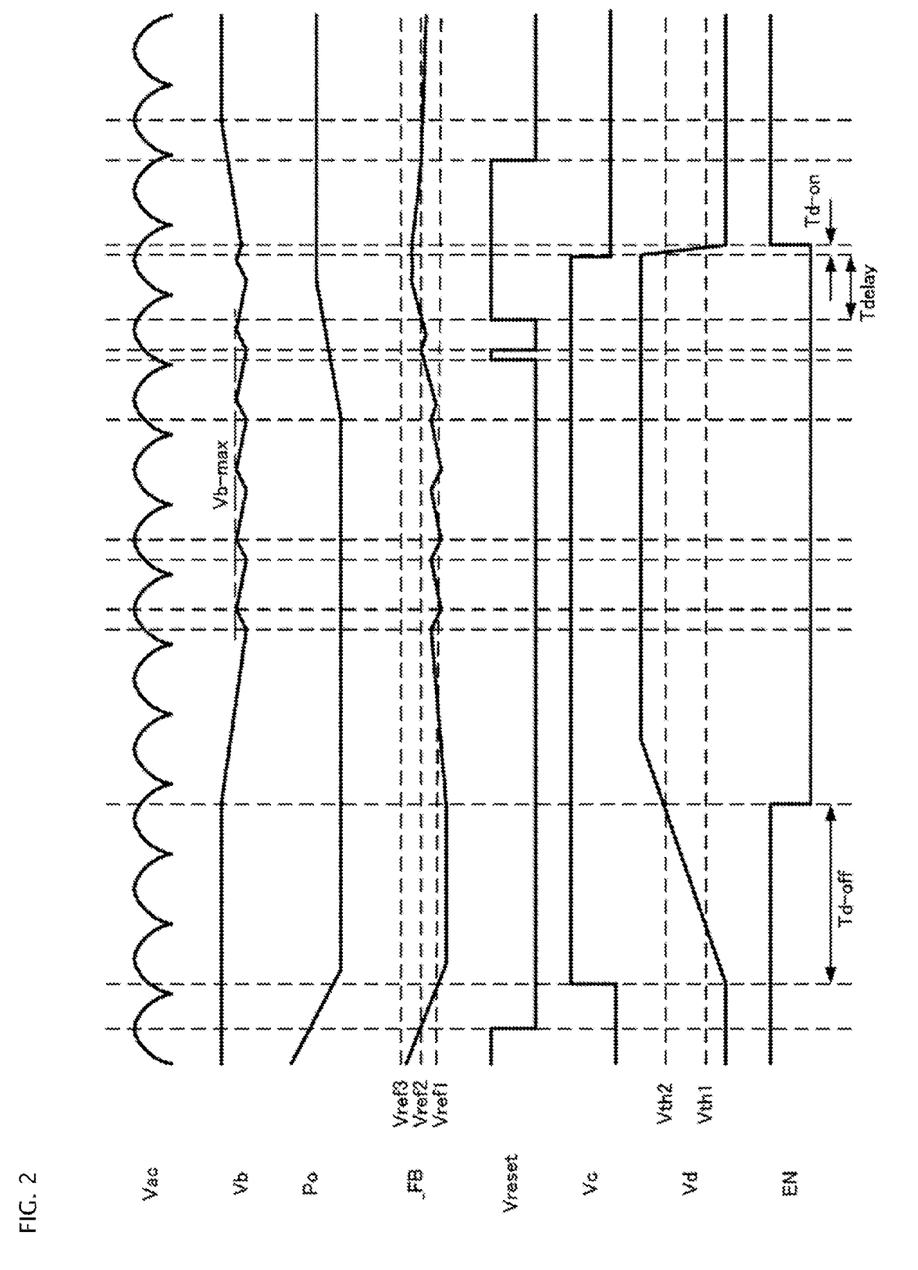
FIG. 2 shows operational waveforms illustrating operation of the load condition detecting circuit of FIG. 1 and action thereof in middle load detection process.

FIG. 2 shows operational waveforms of the switching power supply 1 of the invention comprising the load condition detecting circuit 7 having the construction described above. When the load Po of the DC-DC converter 3 becomes light and correspondingly the feedback voltage decreases below the first threshold voltage Vref1, the flip-flop 7a is set by the output of the comparator 7b, a light load detecting circuit. The setting of the flip-flop 7a turns OFF the switching element S in the delay circuit 7d and the capacitor Ct is charged by the constant current source It in a rate corresponding to the capacitance thereof and the magnitude of the constant current. After a specified period of time Td-off when the charged voltage Vd of the capacitor Ct exceeds a second reference voltage Vth2, the flip-flop 7e is reset to turn the operation permission signal EN to an L level. Thus, the operation of the power factor correction converter 2 is suspended.

After the stop of operation of the power factor correction converter 2, the output voltage Vb of the power factor correction converter 2 gradually decreases and then, settles to a voltage corresponding to the AC voltage Vac supplied by the commercial power supply 5. The output voltage Vb of the power factor correction converter 2 varies periodically with a period of rectification of the AC voltage Vac and with an amplitude determined by the magnitude of the load Po and the capacitance of the output capacitor C2. As described above, the peak voltage Vb-max of the output voltage Vb depends on the AC voltage Vac and the bottom voltage Vb-min thereof depends on the magnitude of the load Po. In embodiments of the invention, the peak voltage Vb-max of the output voltage Vb is detected and, based on this peak voltage Vb-max, the second threshold voltage Vref2 is set as described above.

When the load Po grows heavier in a suspended state of operation of the power factor correction converter 2, the feedback voltage FB in the DC-DC converter 3 rises due to the increase in the load Po. When the feedback voltage FB exceeds the second threshold voltage Vref2, which is set based on the maximum value of the output voltage Vb, the peak voltage Vb-max, as described earlier, the output of the comparator 7c, a middle load detecting circuit, turns to an H level. After this H level of the output of the comparator 7c has continued for a specified period of time Tdelay that is determined by the delay circuit 7i, the output of the delay circuit 7i resets the flip-flop 7a.

If the feedback voltage FB exceeds the second threshold voltage Vref2 only for a period of time shorter than the specified period of time Tdelay that is determined by the delay circuit 7i, the capacitor Ct2 in the delay circuit 7i is discharged at the moment the output of the comparator 7c returns to an L level. Thus, no reset signal is delivered from the delay circuit 7i to the flip-flop 7a. Therefore, even though the feedback voltage FB temporality exceeds the second threshold voltage Vref2, the flip-flop 7a is not reset except that this situation lasts for the period of time Tdelay.

When the flip-flop 7a is reset through the delay circuit 7i that functions as described above, the capacitor Ct in the delay circuit 7d starts to discharge the charges accumulated thereon. After a period of time Td-on when the charged voltage Vd of the capacitor Ct decreases below the first reference voltage Vth1 caused by the discharge of the capacitor Ct, the flip-flop 7e is set to turn the operation permission signal EN to an H level. As a result, the power factor correction converter 2 is permitted to operate and resumes operation thereof.

When the feedback voltage FB exceeds the third threshold voltage Vref3, the comparator 7h detects this event as a rapid increase in the load Po or transition to a heavy load condition and forcedly resets the flip-flop 7a. The feedback voltage FB necessarily exceeds the second threshold voltage Vref2. The above described process is illustrated by the waveforms in FIG. 3.

Figure 3:
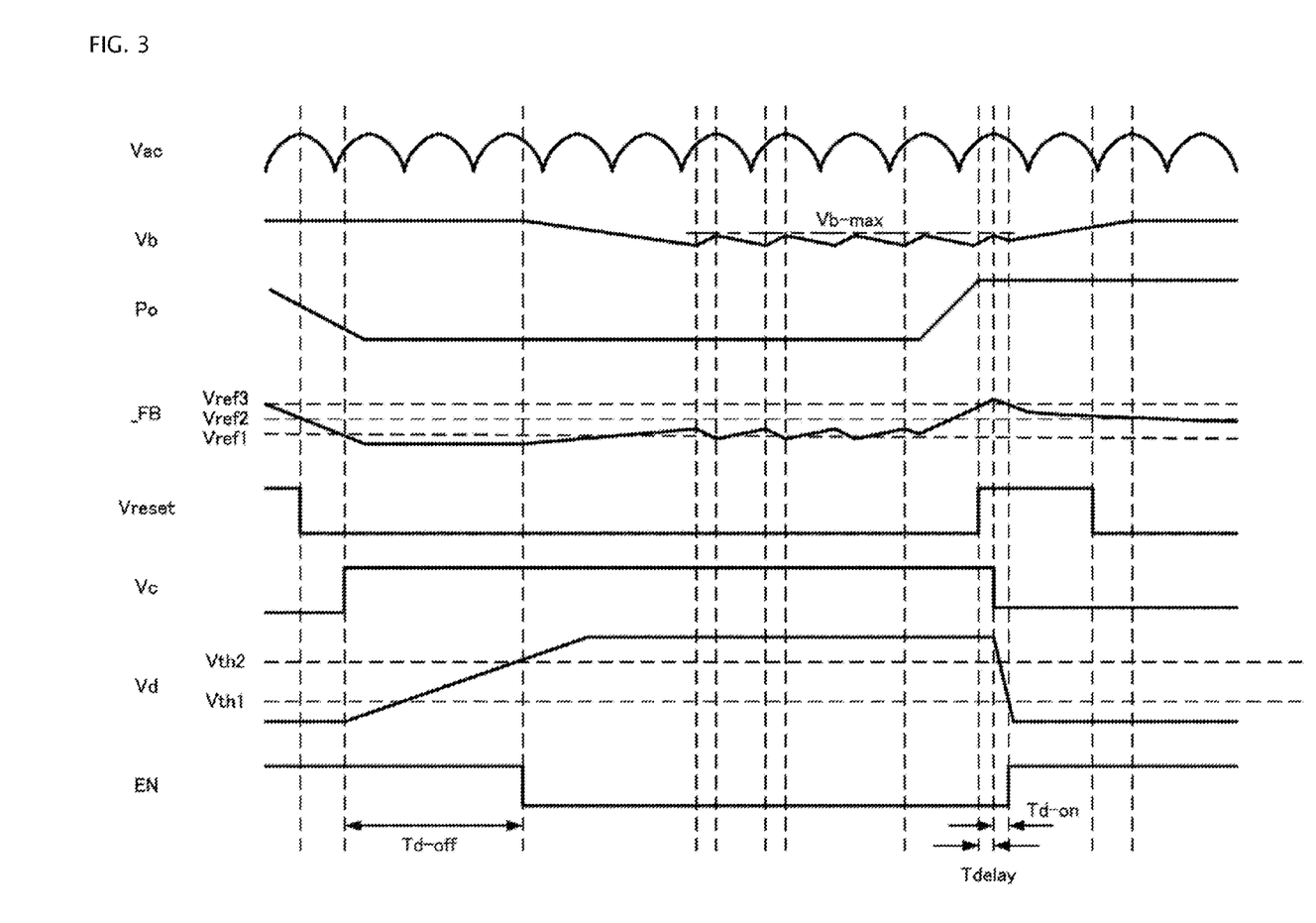
FIG. 3 shows operational waveforms illustrating operation of the load condition detecting circuit of FIG. 1 and action thereof in heavy load detection process.

As described above, on detection by the comparator 7c that the feedback voltage FB has exceeded the second threshold voltage Vref2, the flip-flop 7a is reset after a specified delay time Tdelay through the delay circuit 7i. Thus, a certain period of time, the delay time Tdelay, is needed until the reset of the flip-flop 7a after detection of the feedback voltage FB over the second threshold voltage Vref2. In this respect, when the comparator 7h detects that the feedback voltage FB has exceeded the third threshold voltage Vref3 and determines detection of rapid increase in the load Po, the flip-flop 7a is immediately set without passing the specified period time Tdelay. Thus, upon determination of detection of a heavy load condition by the comparator 7h, the operation permission signal EN is rapidly delivered to resume operation of the power factor correction converter 2. Therefore, embodiments of the invention can prevent the undesirable situation in which resume of operation of the power factor correction converter 2 is delayed and consequently unstable operation of the DC-DC converter 3 results.

As described above, the load condition detecting circuit 7 as constructed above sets the second threshold voltage Vref2 for the comparator 7c, which is a middle load detecting circuit, and the third threshold voltage Vref3 for the comparator 7h, which is a heavy load detecting circuit, based on the peak voltage Vb-max of the output voltage Vb of the power factor correction converter 2. Therefore, even under a condition of dropped AC voltage Vac, the load condition detecting circuit 7 ensures detection of the increase in the feedback voltage FB caused only by increase in the load Po.

Even if the feedback voltage FB in the DC-DC converter 3 would rise due to the decrease of the output voltage Vb of the power factor correction converter 2 corresponding to the decrease in the AC voltage Vac, the erroneous detection should not occur that the feedback voltage rise due to the drop of the AC voltage Vac is recognized as indication of increase in the load Po, because the second and third threshold voltages Vref2 and Vref3 for the feedback voltage FB are set at high values corresponding to the decrease of the peak voltage Vb-max of the output voltage Vb.

Thus, even when the AC voltage Vac drops, the load condition detecting circuit 7 catches certainly the variation of the feedback voltage FB that is caused by variation of the load Po and in particular detects the increase in the load Po during a suspended state of the power factor correction converter 2 without failure. In the event of abrupt increase in the load Po, the flip-flop 7a is forcedly set without waiting the specified delay time Tdelay and the operation permission signal EN is immediately delivered to resume operation of the power factor correction converter 2. Therefore, generation of power loss is prevented in the power factor correction converter 2, enhancing the overall conversion efficiency of embodiments of the switching power supply 1.

When the load Po has abruptly increased during the suspended period of operation of the power factor correction converter 2, an operation permission signal EN is immediately delivered according to the detection of increase in the load Po by the comparator 7h, which is a heavy load detecting circuit, prior to delivery of an operation permission signal EN corresponding to the detection of increase in the load Po by the comparator 7c, which is a medium load detecting circuit. Therefore, any trouble is avoided that causes unstable operation of the DC-DC converter 3 due to delay of resume of operation of the power factor correction converter 2.

Figure 4:
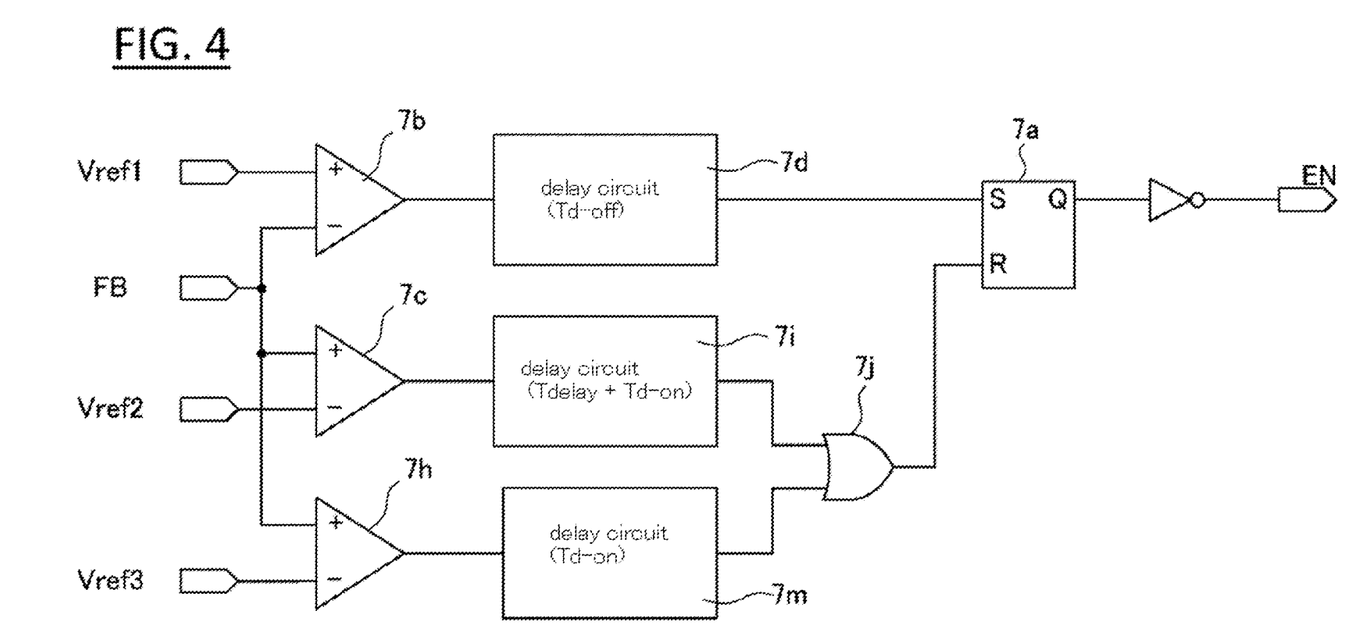
FIG. 4 shows another example of construction of a load condition detecting circuit.

A load condition detecting circuit can also be constructed as shown in FIG. 4 in which the delay circuit 7d for delaying the output of the flip-flop 7a in FIG. 1 is moved to the previous stage of the flip-flop 7a and the operation permission signal EN is obtained directly from the flip-flop 7a. In this construction, a delay circuit 7m is provided to delay the output of the comparator 7h for the specified period of time Td-on, and the delay circuit 7d for delaying the output of the comparator 7b sets the specified period of time Td-off. A delay circuit 7i for delaying the output of the comparator 7c sets a period of time (Tdelay+Td-on) that is the sum of the specified period of time Td-on and the previously mentioned period of time Tdelay. The thus constructed load condition detecting circuit of FIG. 4 operates similarly to the load condition detecting circuit 7 of FIG. 1.

The load condition detecting circuit of the embodiment described thus far determined increase in the load Po by detecting variation of the feedback voltage FB of the DC-DC converter 3. With the variation of the load Po, a period of time Tonoff of ON/OFF driving period of the switching element Q2 in the DC-DC converter 3 also varies. Therefore, the increase in the load Po during a suspended period of the power factor correction converter 2 can be determined according to the period of time Tonoff of the ON/OFF driving period.

In this controlling mode, a periodical voltage Vsw is generated in proportion to the period of time Tonoff of the ON/OFF driving period of the switching element Q2. The second and third threshold voltages Vref2 and Vref3 for this periodical voltage Vsw are set based on the peak voltage Vb-max. Consequently, these second and third threshold voltages Vref2 and Vref3 also vary with variation of the DC voltage Vb like in the previous embodiment and are set at high values corresponding to the increase in the periodical voltage Vsw due to decrease in the DC voltage Vb.

The period of time Tonoff of ON/OFF driving period means the period of time from a turning ON moment of the switching element Q2 to the first bottom moment in the Vds waveform of the switching element Q2. In the case of the DC-DC converter 3 of a quasi-resonance converter, bottom skipping control is conducted in order to restrain the upper limit of the switching frequency under a light load condition. In the bottom skip control, the switching element Q2 is turned ON after detecting certain times of bottoms of the drain voltage that exhibits resonant oscillation after turning OFF of the switching element Q2. The period of time Tonoff includes the additional time resulted from the bottom skip control.

Figure 5:
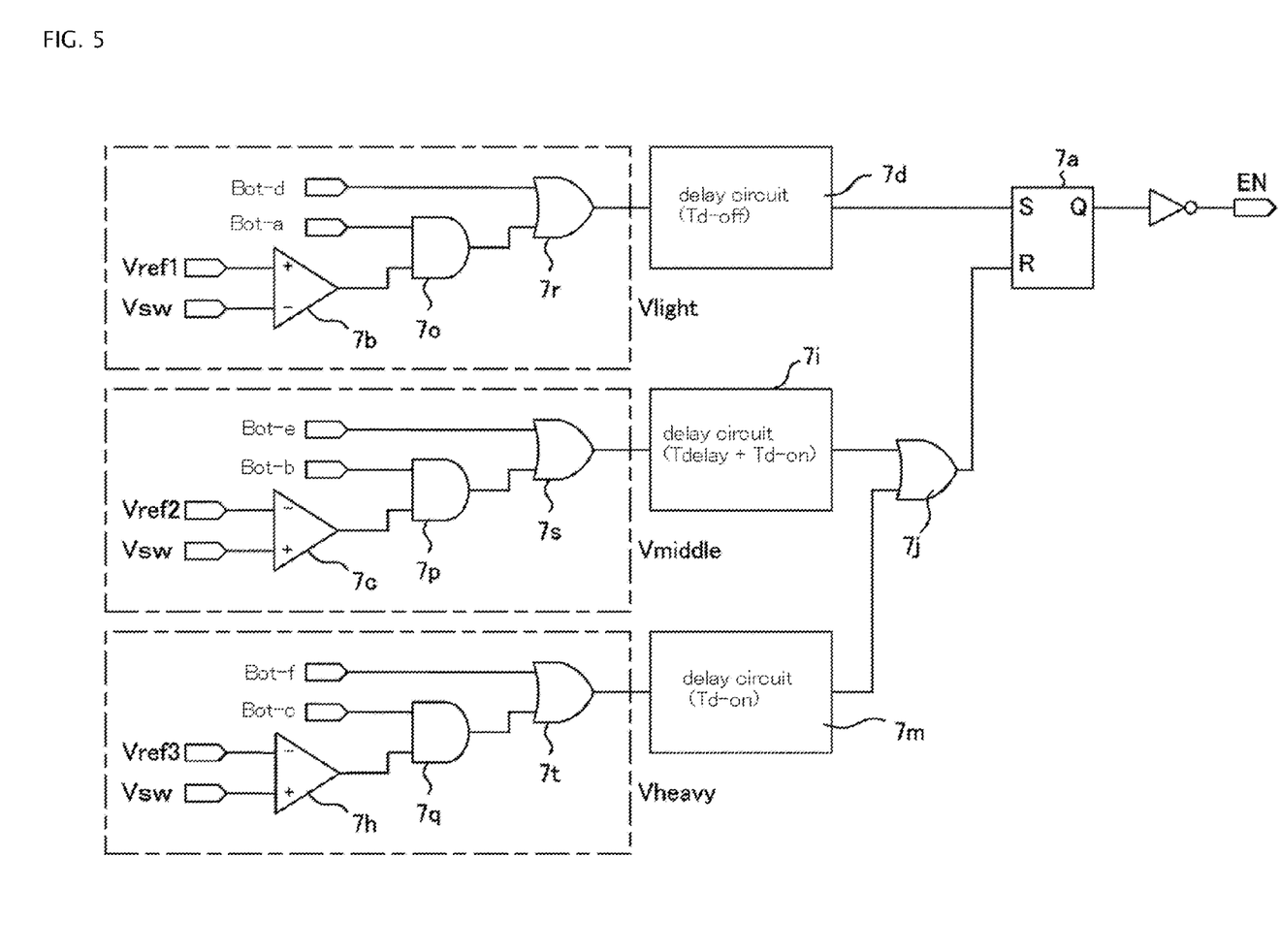
FIG. 5 shows still another example of construction of a load condition detecting circuit.

FIG. 5 shows a schematic construction of a load condition detecting circuit 7 that detects variation of the load Po based on the periodic voltage Vsw. The comparator 7b in FIG. 5 compares the periodic voltage Vsw with the first threshold voltage Vref1 and determines a light load condition to suspend operation of the power factor correction converter 2. In the suspended state of the power factor correction converter 2, the comparator 7c compares the periodic voltage Vsw with the second threshold voltage Vref2 and the comparator 7h compares the periodic voltage Vsw with the third threshold voltage Vref3 to determines detection of increase in the load Po and deliver an operation permission signal EN to permit operation of the power factor correction converter 2.

The load condition detecting circuit 7 of FIG. 5 comprises AND circuits 7o, 7p, and 7q that receive the outputs of the comparators 7b, 7c, and 7h composing a light load detecting circuit, a middle load detecting circuit, and a heavy load detecting circuit, respectively, and are gate-controlled with bottom control signals Bot-a, Bot-b, and Bot-c, which are described afterwards. The outputs of the AND circuits 7o, 7p, and 7q are delivered to the delay circuits 7d, 7i, and 7m through OR circuits 7r, 7s, and 7t. The delay circuits 7d, 7i, and 7m also receive through the OR circuits 7r, 7s, and 7t bottom control signals Bot-d, Bot-e, and Bot-f that are related to the bottom control signals Bot-a, Bot-b, and Bot-c, respectively.

In a quasi-resonance converter, as described previously, the bottom skip control is conducted in order to restrict the minimum value of the ON/OFF period of the switching element Q2 in a light load condition. In the bottom skip control, the number of bottoms in the oscillating drain voltage is counted, the drain voltage oscillating associated with oscillating current after turning OFF of the switching element Q2. The switching element Q2 is turned ON after the detected number of bottoms reaches a predetermined value under a light load condition. The bottom control signals Bot-a through Bot-f are control signals used in the bottom skip control and become an H level at a predetermined bottom skip number.

The number of bottom skips is set, for example, at zero or one for a heavy load condition, at two or three for a medium load condition, and at four to ten for a light load condition. The number of bottom skips of zero means that the switching element Q2 is turned ON detecting the first bottom after turning OFF of the switching element Q2. The number of bottom skips of five means that the switching element Q2 is turned ON detecting the sixth bottom after skipping five bottoms since turning OFF of the switching element Q2.

The AND circuit 7o becomes active when the DC-DC converter 3 is in a middle load condition and such a bottom control signal Bot-a is given that becomes an H level at the number of bottom skips of four, for example, delivering a signal that is detected by the comparator 7b and indicating a light load condition. Consequently, the AND circuit 7o performs to set the flip-flop 7a when the load Po transitions from a middle load condition to a light load condition.

The OR circuit 7r receives a bottom control signal Bot-d related to the bottom control signal Bot-a. Specifically, the bottom control signal Bot-d is at an H level for the number of skips of from five to ten. When a light load condition of the load Po is determined by the bottom control signal Bot-d, the flip-flop 7a is forcedly set irrespective of detection of the transition from a middle load condition to a light load condition by the comparator 7b.

The AND circuit 7p becomes active when the DC-DC converter 3 is in a light load condition and such a bottom control signal Bot-b is given that becomes an H level at the number of skips of three, for example. Consequently, the AND circuit 7p passes the signal indicating a middle load condition from the comparator 7c to the OR circuit 7s. In other words, the AND circuit 7p performs to set the flip-flop 7a when the load Po transitions from a light load condition to a middle load condition.

The OR circuit 7s receives a bottom control signal Bot-e related to the bottom control signal Bot-b. Specifically, the bottom control signal Bot-e is set at an H level for the number of skips of two. When a middle load condition of the load Po is determined by the bottom control signal Bot-e, the flip-flop 7a is forcedly reset irrespective of detection of the transition from a light load condition to a middle load condition by the comparator 7c.

The AND circuit 7q becomes active when the DC-DC converter 3 is in a light load condition and such a bottom control signal Bot-c is given that becomes an H level at the number of skips of one, for example. Consequently, the AND circuit 7q passes the signal indicating a heavy load condition from the comparator 7h to the OR circuit 7t. In other words, the AND circuit 7q performs to set the flip-flop 7a when the load Po transitions from a light load condition to a heavy load condition.

The OR circuit 7t receives a bottom control signal Bot-f related to the bottom control signal Bot-c. Specifically, the bottom control signal Bot-f is set at an H level for the number of skips of zero or one. When a heavy load condition of the load Po is determined by the bottom control signal Bot-f, the flip-flop 7a is forcedly set irrespective of detection of the transition from a light load condition to a heavy load condition by the comparator 7h.

The load condition detecting circuit 7 described above with reference to FIG. 5 compares the periodic voltage Vsw to determine increase in the load Po using the second threshold voltage Vref2 that is set based on the peak voltage Vb-max of the output voltage Vb of the power factor correction converter 2. The load condition detecting circuit 7 of FIG. 5 also determines the load condition of the DC-DC converter 3 that is a quasi-resonance converter utilizing the bottom control signals Bot-a through Bot-f, which are employed for controlling the turn ON timing of the switching element Q2 in the quasi-resonance converter. The load condition detecting circuit 7 controls delivery of the operation permission signal EN according to the determination of the load condition, thereby ON/OFF controlling the operation of the power factor correction converter 2.

The load condition detecting circuit 7 having the construction described above consequently does not erroneously determine increase in the load Po observing a rise in the periodic voltage Vsw proportional to the period of time Tonoff of ON/OFF driving of the switching element Q2 due to drop of the AC voltage Vac and assures detection of the increase in the Vsw caused by the variation of the load Po. Thus, the load condition detecting circuit 7 catches the variation of the periodic voltage Vsw caused by the variation of the load Po and ensures detection of the increase in the load Po in the suspended state of the power factor correction converter 2. Moreover, since the bottom control signals Bot-a through Bot-f are also used for detecting the variation of the load Po, operation of the power factor correction converter 2 is controlled appropriately with high reliability.

Embodiments of the switching power supply 1 provided with the load condition detecting circuit 7 suspends operation of the power factor correction converter 2 in a light load condition and, when the load Po increases during the suspended period of the power factor correction converter 2, the load condition detecting circuit 7 resumes operation of the power factor correction converter 2. Operation of the power factor correction converter 2 is appropriately controlled corresponding to the load condition even when the AC voltage Vac is dropped. Therefore, conversion efficiency of the switching power supply 1 is raised satisfactorily.

Figure 6:
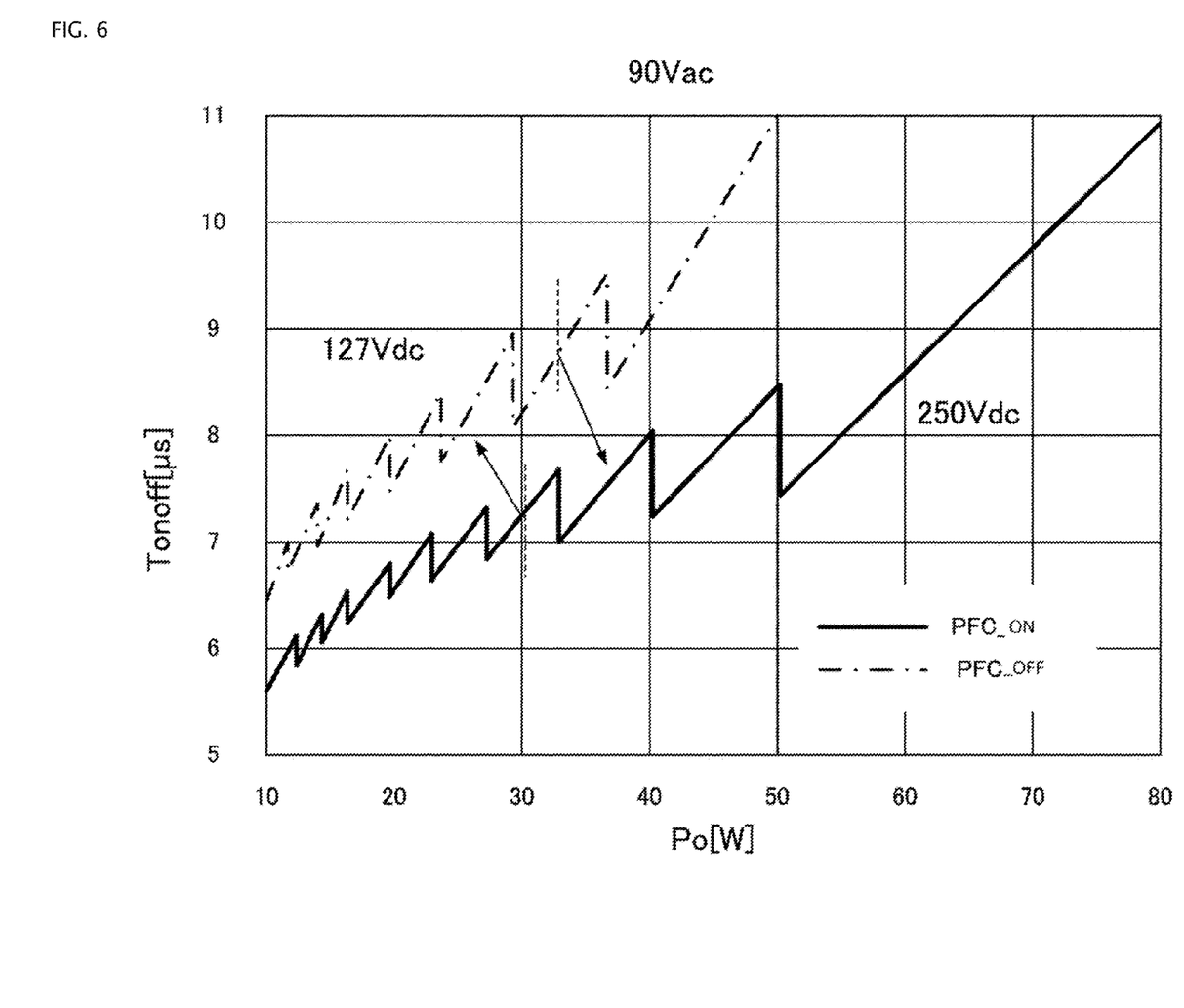
FIG. 6 shows a relationship between a load Po and a period of time Tonoff of an ON/OFF driving period of the switching element Q2 in the quasi-resonance converter.

FIG. 6 shows a relationship between the load Po and the period of time Tonoff of ON/OFF driving period of the switching element Q2 varying with variation of the magnitude of the load Po of the DC-DC converter 3 that generates a specified DC output voltage Vo by switching the output voltage Vb of the power factor correction converter 2 in the switching power supply 1 having a power factor correction converter 2 that delivers an output voltage Vb of 250 Vdc from an input of AC voltage of 90 Vac.

The solid line in FIG. 6 shows a characteristic of the DC-DC converter 3 that is given an output voltage Vb of DC voltage 250 Vdc from the power factor correction converter 2 in an operating state of the power factor correction converter 2. The chain line shows a characteristic of the DC-DC converter 3 that is given an output voltage Vb of the power factor correction converter 2, the voltage Vb being a DC voltage of 127 Vdc obtained by rectifying and smoothing the AC voltage of 90 Vac in a suspended state of the power factor correction converter 2.

The load condition detecting circuit 7 examines the period of time Tonoff of the ON/OFF driving period of the switching element Q2 and determines the load condition. According to the determination result, the operation of the power factor correction converter 2 is suspended and resumed. FIG. 6 shows enough width of power hysteresis between an operating state and a suspended state of the power factor correction converter 2 even in a low AC voltage of 90 Vac. Thus, the power factor correction converter 2 can be operated under stable control.

More specifically, when the period of time Tonoff of the ON/OFF driving period of the switching element Q2 decreases to for example 7.2 μs or shorter with decrease in the load Po in an operating state of the power factor correction converter 2, the operation of the power factor correction converter 2 is suspended. When the period of time Tonoff of the ON/OFF driving period of the switching element Q2 increases to for example 8.7 μs or longer with increase in the load Po in a suspended state of the power factor correction converter 2, the operation of the power factor correction converter 2 is resumed. This control of operation of the power factor correction converter 2 ensures an enough width of the power hysteresis even at a low AC voltage of 90 Vac. Therefore, the power factor correction converter 2 can be operated under stable ON/OFF control.

As described above concerning the load condition detecting circuit 7 of a switching power supply according to an embodiment of the present invention, attention is directed in the invention to the fact that the maximum value of the output voltage, the peak voltage Vb-max, of the power factor correction converter 2 varies corresponding to the input AC voltage Vac in a suspended state of the power factor correction converter 2. The second threshold voltage Vref2, which is a threshold value for permitting operation of the power factor correction converter 2, is set based on the peak voltage Vb-max, the maximum value of the output voltage Vb.

Consequently, even when the voltage Vac of the AC power supplied to the switching power supply 1 drops and the output voltage Vb of the power factor correction converter 2 decreases with this drop of the AC voltage Vac, the switching power supply of the invention ensures detection of the load Po on the DC-DC converter 3. Thus, increase in the load Po is detected certainly in a suspended period of the power factor correction converter 2 to resume operation of the power factor correction converter 2. Therefore, the switching power supply 1 is operated with high efficiency restraining the power loss in the power factor correction converter 2 to a minimum.

Embodiments of t invention are not limited to the embodiments described thus far. For example, the delay time Tdelay set in the delay circuit 7i can be sufficiently set at any period of time not shorter than the half period of the AC voltage Vac. Also the second threshold voltage Vref2 that is set corresponding to the varying peak voltage Vb-max of the output voltage Vb can be sufficiently set corresponding to the allowable minimum value of the AC voltage Vac or the bottom voltage Vb-min of the varying output voltage Vb with drop of the AC voltage Vac.

For the DC-DC converter 3, a converter other than the quasi-resonance converter, for example, a multi-oscillated current resonant dc-dc converter can be employed similarly in an embodiment of the present invention. Embodiments of the invention can be carried out in various other modifications within spirit and scope of the invention.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-157049, filed on Jul. 13, 2012, contents of which are incorporated herein by reference.

What is claimed is:

1. A switching power supply comprising:
   a power factor correction converter that conducts switching of an input AC voltage to obtain a DC voltage;
   a DC-DC converter that conducts switching of an output voltage of the power factor correction converter to obtain a specified DC output voltage; and
   a load condition detecting circuit that delivers an operation permission signal to the power factor correction converter corresponding to a load condition of the DC-DC converter and permits or stops operation of the power factor correction converter;
   wherein the load condition detecting circuit
   sets a second threshold voltage and a third threshold voltage for determining a magnitude of the load on the DC-DC converter based on the maximum value of the output voltage of the power factor correction converter in a suspended state of operation of the power factor correction converter;
   delivers the operation permission signal when a signal indicating the magnitude of the load on the DC-DC converter changes from being below the second threshold voltage to exceeding the second threshold voltage for a specified period of time in a suspended state of operation of the power factor correction converter; and
   delivers the operation permission signal when the signal indicating the magnitude of the load on the DC-DC converter changes from being below the third threshold voltage to exceeding the third threshold voltage in a suspended state of operation of the power factor correction converter.

2. The switching power supply according to claim 1, wherein the DC-DC converter is a quasi-resonance converter.

3. A switching power supply comprising:
   a power factor correction converter that conducts switching of an input AC voltage to obtain a DC voltage;
   a DC-DC converter that conducts switching of an output voltage of the power factor correction converter to obtain a specified DC output voltage; and
   a load condition detecting circuit that delivers an operation permission signal to the power factor correction converter corresponding to a load condition of the DC-DC converter and permits or stops operation of the power factor correction converter;
   wherein the load condition detecting circuit sets a second threshold voltage and a third threshold voltage for determining a magnitude of the load on the DC-DC converter based on the maximum value of the output voltage of the power factor correction converter in a suspended state of operation of the power factor correction converter;

delivers the operation permission signal when a signal indicating the magnitude of the load on the DC-DC converter exceeds the second threshold voltage for a specified period of time in a suspended state of operation of the power factor correction converter; and delivers the operation permission signal when the signal indicating the magnitude of the load on the DC-DC converter exceeds the third threshold voltage in a suspended state of operation of the power factor correction converter wherein the load condition detecting circuit comprises, in a suspended state of operation of the power factor correction converter, a voltage detecting means that detects the maximum value of the output voltage of the power factor correction converter, the load condition detecting circuit sets the second threshold voltage and the third threshold voltage for determining the magnitude of the load on the DC-DC converter corresponding to the maximum value of the output voltage that is detected by the voltage detecting means.

4. A switching power supply comprising:
a power factor correction converter that conducts switching of an input AC voltage to obtain a DC voltage;
a DC-DC converter that conducts switching of an output voltage of the power factor correction converter to obtain a specified DC output voltage; and
a load condition detecting circuit that delivers an operation permission signal to the power factor correction converter corresponding to a load condition of the DC-DC converter and permits or stops operation of the power factor correction converter;
wherein the load condition detecting circuit
sets a second threshold voltage and a third threshold voltage for determining a magnitude of the load on the DC-DC converter based on the maximum value of the output voltage of the power factor correction converter in a suspended state of operation of the power factor correction converter;
delivers the operation permission signal when a signal indicating the magnitude of the load on the DC-DC converter exceeds the second threshold voltage for a specified period of time in a suspended state of operation of the power factor correction converter; and
delivers the operation permission signal when the signal indicating the magnitude of the load on the DC-DC converter exceeds the third threshold voltage in a suspended state of operation of the power factor correction converter wherein
the second threshold voltage and the third threshold voltage are set as threshold voltages for a feedback voltage that is used for controlling a DC output voltage in the DC-DC converter, and
the load condition detecting circuit comprises:
a flip-flop that delivers the operation permission signal when the flip-flop is reset;
a light load detecting circuit that sets the flip-flop when the feedback voltage falls below a predetermined first threshold voltage;
a middle load detecting circuit that resets the flip-flop when the feedback voltage exceeds, for a specified period of time, the second threshold voltage that is higher than the first threshold voltage and determined based on the maximum value of an input voltage to the DC-DC converter; and
a heavy load detecting circuit that resets the flip-flop forcedly when the feedback voltage exceeds the third threshold voltage that is set at a value higher than the second threshold voltage.

5. The switching power supply according to claim 4, wherein the specified period of time set in the middle load detecting circuit is about a half period of the AC power or longer.

6. A switching power supply comprising:
a power factor correction converter that conducts switching of an input AC voltage to obtain a DC voltage;
a DC-DC converter that conducts switching of an output voltage of the power factor correction converter to obtain a specified DC output voltage; and
a load condition detecting circuit that delivers an operation permission signal to the power factor correction converter corresponding to a load condition of the DC-DC converter and permits or stops operation of the power factor correction converter;
wherein the load condition detecting circuit
sets a second threshold voltage and a third threshold voltage for determining a magnitude of the load on the DC-DC converter based on the maximum value of the output voltage of the power factor correction converter in a suspended state of operation of the power factor correction converter;
delivers the operation permission signal when a signal indicating the magnitude of the load on the DC-DC converter exceeds the second threshold voltage for a specified period of time in a suspended state of operation of the power factor correction converter; and
delivers the operation permission signal when the signal indicating the magnitude of the load on the DC-DC converter exceeds the third threshold voltage in a suspended state of operation of the power factor correction converter wherein
the second threshold voltage and the third threshold voltage are set as threshold voltages for a periodic voltage that is proportional to a period of time of an ON/OFF driving period of an switching element in the DC-DC converter, and
the load condition detecting circuit comprises:
a flip-flop that delivers the operation permission signal when the flip-flop is reset;
a light load detecting circuit that sets the flip-flop when the periodic voltage falls below a predetermined first threshold voltage;
a middle load detecting circuit that resets the flip-flop when the periodic voltage exceeds, for a specified period of time, the second threshold voltage that is higher than the first threshold voltage and determined based on the maximum value of an input voltage to the DC-DC converter; and
a heavy load detecting circuit that resets the flip-flop forcedly when the periodic voltage exceeds the third threshold voltage that is set at a value higher than the second threshold voltage.

7. The switching power supply according to claim 6, wherein the specified period of time set in the middle load detecting circuit is about a half period of the AC power or longer.

* * * * *